United States Patent
Mandel

Patent Number: 5,533,805
Date of Patent: Jul. 9, 1996

[54] FREE-STANDING STIRRER APPLIANCE

[76] Inventor: SaraLynn Mandel, P.O. Box 1209, El Granada, Calif. 94018

[21] Appl. No.: 429,797

[22] Filed: Apr. 27, 1995

[51] Int. Cl.⁶ .................................................. B01F 7/20
[52] U.S. Cl. ........................ 366/285; 366/286; 366/197
[58] Field of Search ........................... 366/65, 97, 98, 366/129, 197, 241, 255, 256, 257, 258, 208, 347, 601, 332, 251, 285, 286

[56] References Cited

U.S. PATENT DOCUMENTS

| | | | |
|---|---|---|---|
| D. 338,371 | 8/1993 | Thomas | D7/379 |
| 765,710 | 7/1904 | Pullen | 366/332 |
| 1,704,025 | 3/1929 | Wahl | 366/197 |
| 2,281,094 | 4/1942 | Chambers | 366/332 |
| 3,326,532 | 6/1967 | Lodge | 366/286 |
| 3,362,691 | 1/1968 | Shilling | 366/197 |
| 3,697,053 | 10/1972 | Will | 259/107 |
| 3,783,770 | 1/1974 | Aries | 99/348 |
| 3,810,605 | 5/1974 | Lambert | 259/108 |
| 3,820,763 | 6/1974 | Questi, Sr. | 366/65 |
| 4,151,792 | 5/1979 | Nearhood | 99/348 |
| 4,184,779 | 1/1980 | Detmer | 366/282 |
| 4,277,181 | 7/1981 | Stahly et al. | 366/69 |
| 4,339,992 | 7/1982 | Kurland | 99/348 |
| 4,417,506 | 11/1983 | Herbst et al. | 99/348 |
| 4,429,624 | 2/1984 | Linn | 99/348 |
| 4,576,089 | 3/1986 | Chauvin | 99/332 |
| 4,647,213 | 3/1987 | Hay, II | 366/347 |
| 4,822,172 | 4/1989 | Stottmann | 366/142 |
| 4,832,501 | 5/1989 | McCauley | 366/279 |
| 4,854,717 | 8/1989 | Crane et al. | 366/197 |
| 4,898,474 | 2/1990 | Lipson | 366/286 |
| 4,921,356 | 5/1990 | Bordenga | 366/343 |
| 5,013,158 | 5/1991 | Tarlow | 366/251 |
| 5,145,250 | 9/1992 | Planck | 366/197 |
| 5,332,310 | 7/1994 | Wells | 366/129 |
| 5,372,422 | 12/1994 | Dubroy | 366/251 |
| 5,380,086 | 1/1995 | Dickson | 366/601 |
| 5,476,321 | 12/1995 | McNaughton | 366/261 |

FOREIGN PATENT DOCUMENTS

| | | | |
|---|---|---|---|
| 723865 | 4/1932 | France | 366/197 |
| 852133 | 10/1952 | Germany | 366/286 |
| 1251702 | 10/1967 | Germany | 366/197 |
| 2013513 | 10/1970 | Germany | 366/197 |
| 289841 | 10/1931 | Italy | 366/197 |
| 8230160 | 5/1984 | United Kingdom . | |

*Primary Examiner*—Frankie L. Stinson
*Assistant Examiner*—Randall E. Chin

[57] ABSTRACT

A free standing motor driven stirrer appliance for stirring food in a utensil located beyond the base of the appliance such as food cooking in a pan on a heating source. An adjustable support extends upward and transversely from the base to reach a utensil containing food and includes receiving means driven by the motor for attaching and rotating a downwardly directed stirrer element. Interchangeable stirrer elements have a shaped bottom end for stirring and are removable and adjustable in length.

17 Claims, 3 Drawing Sheets

U.S. Patent     Jul. 9, 1996     Sheet 1 of 3     5,533,805
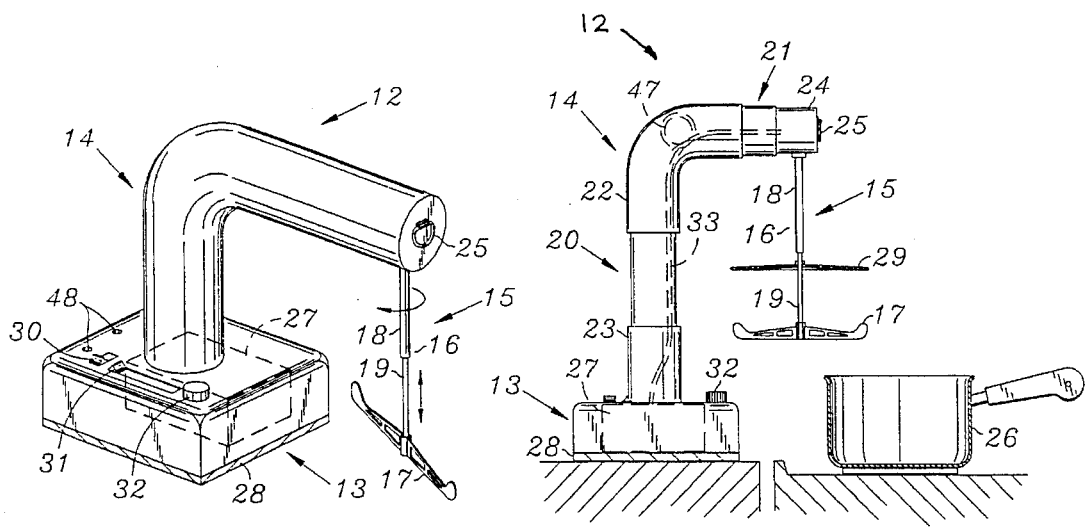
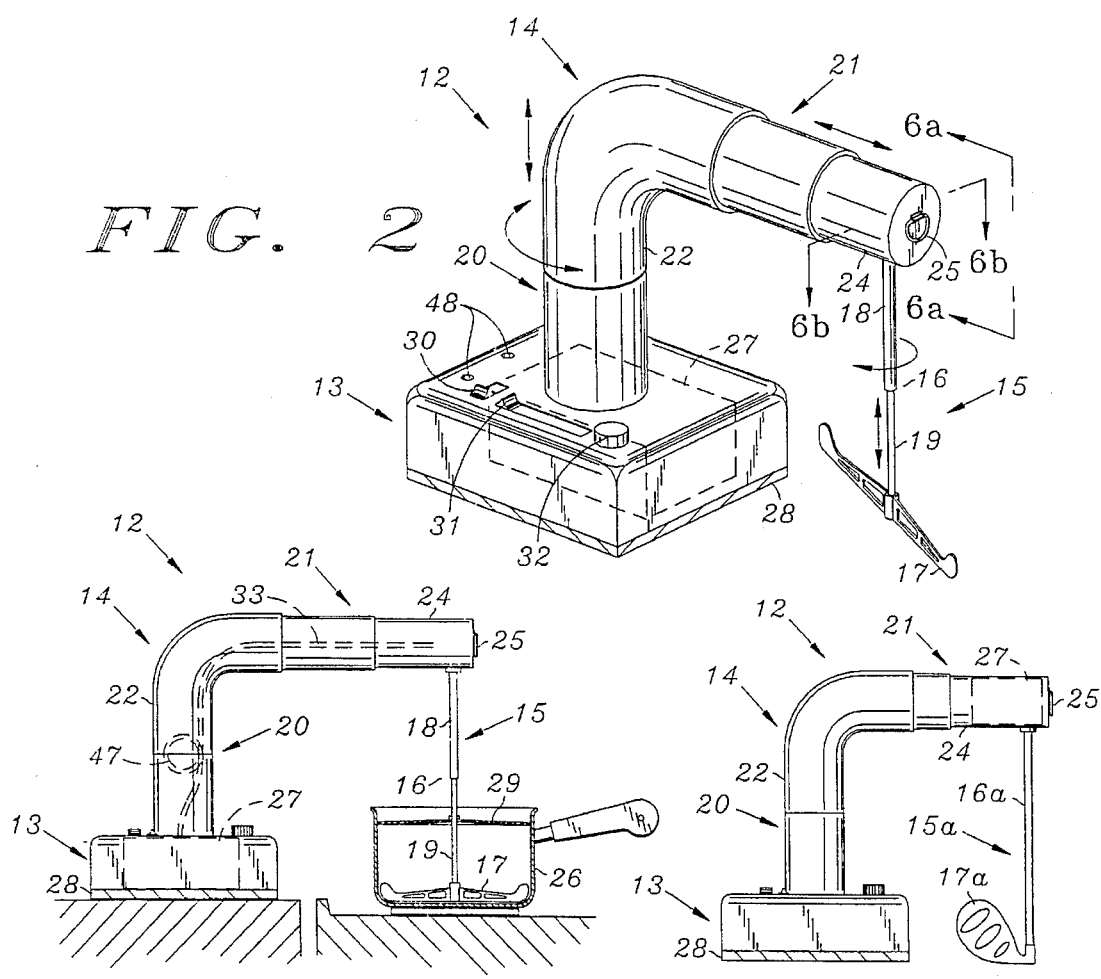

FREE-STANDING STIRRER APPLIANCE

FIELD OF THE INVENTION

The present invention relates to a stirrer appliance, and more particularly to a free-standing motor driven stirrer for use in cooking utensils to stir food, particularly while cooking food over a heat source.

BACKGROUND OF THE INVENTION

The preparation of sauces, gravies, puddings, spreads and dips and similar foodstuffs typically requires manual stirring for lengths of time, particularly during cooking over heat, to prevent scorching, boiling over and/or the formation of lumps. Such manual stirring is tedious and impractical for the cook in the commercial, restaurant or home kitchen where other activities beckon. Currently available blenders or mixers do not conveniently permit concurrent cooking or heating while mixing and typically agitate at speeds greater than those needed for stirring of semi-liquid foodstuffs.

In the art various domestic manual and electric operated food mixers are known including portable devices as well as stand mixers. U.S. Pat. No. 4,854,717 to Crane and Liddell discloses a hand-operated mixing and folding device. U.S. Design Pat. No. 338,371 to Thomas depicts a portable food mixer with a housing containing the motor for operating two beaters. U.S. Pat. No. 4,822,172 to Stottmann and U.S. Pat. No. 4,277,181 to Stahly et al. disclose variations of a stand mixer having a horizontal housing holding the motor. These prior stand mixers do not permit agitation of foodstuffs in a pot or pan cooking over a heat source because the agitating elements are limited in position over a bowl or pan placed in the base of the stand directly under the elements. The portable food mixer such as disclosed by Thomas requires the operator to hold the device over the utensil containing the food.

Devices are also known for stirring the contents of a pan over a heat source. Representative devices include those disclosed by Stephens in U.S. Pat. No. 3,357,685, Pankow in U.S. Pat. No. 3,421,743, Mihalyi and Wexler in U.S. Pat. No. 3,656,974, Will in U.S. Pat. No. 3,697,053, Aries in U.S. Pat. No. 3,783,770, Lambert in U.S. Pat. No. 3,810,605, Nearhood in U.S. Pat. No. 4,151,792, Detmer in U.S. Pat. No. 4,184,779, Kurland in U.S. Pat. No. 4,339,992, Herbst and Wolens in U.S. Pat. No. 4,417,506, Linn in U.S. Pat. No. 4,429,624, Kemple in UK patent application GB 8230160, Chauvin in U.S. Pat. No. 4,576,089, McCauley in U.S. Pat. No. 4,832,501, Bordenga in U.S. Pat. No. 4,921,356, Tarlow in U.S. Pat. No. 5,013,158 and Wells in U.S. Pat. No. 5,332,310.

These prior stirring devices, while permitting stirring of food in a utensil while cooking, all require direct and substantial engagement of the device with the utensil to support the body of the stirring device during use. For example, these known devices typically engage the lip or rim of the heating utensil. Alternatively, the stirring appliance disclosed by Wells, U.S. Pat. No. 5,332,310 requires that the stirring mechanism rest on the bottom of the saucepan to support the device. An extension of the handle of the stirring device also engages the handle of the saucepan during use to prevent rotation of the device during operation.

Accordingly, the present invention provides a new and improved free-standing motor driven stirrer appliance that does not require attachment or engagement of any part of the appliance with the utensil holding the food for stirring, and does not require the operator to maintain contact with any part of the appliance during operation. The only element inserted into the utensil is the stirrer element. Thus, the stirrer appliance of the present invention is more convenient than prior devices because it is not cumbersome to operate or remove, for example to stir food in other utensils, and can free the cook to perform other activities for periods of time.

SUMMARY OF THE INVENTION

The free-standing stirrer appliance of the present invention provides a number of improvements over the stirrers and mixers of the prior art. In particular, the stirrer appliance comprises a free-standing motor driven device for use in stirring food in a utensil such as a pot or pan which comprises a free-standing base defining a perimeter, and an upwardly and transversely extending support affixed to the base which extends beyond the perimeter of the base during use. The base is independent from the utensil containing the food for stirring. Receiving means directed downwardly for removeably receiving an interchangeable elongated stirrer element are located in the support. Other stirrer elements with different shaped ends can be interchangeably used. A motor which may have a flexible drive is located in the support or base operatively connected to the receiving means to rotate the stirring element. The motor may drive the stirrer element at variable speeds. In one embodiment for placement on a flat surface the support is extendible and contractible in the horizontal and/or vertical direction. The stirrer element may also adjust in the vertical direction. Adjustment of the support and/or the stirrer element permits selection of placement of the stirrer element within an utensil. In another embodiment for attachment to a vertical surface such as a wall the support extends transversely from the base and is adjustable.

BRIEF DESCRIPTION OF THE DRAWINGS

The invention is illustrated by the accompanying drawings in which corresponding parts are identified by the same numerals and in which FIG. 1 is a top perspective view of an embodiment of the stirrer appliance of the present invention having an upward and transverse support that has a removable interchangeable stirrer element inserted.

FIG. 2 is a top perspective view of another embodiment of the stirrer appliance having an upwardly and transversely adjustable support.

FIG. 3 is a side plan view of the embodiment of FIG. 2 adjacent to a saucepan on a heating surface showing the stirrer appliance partially transversely extended and with an interchangeable stirrer element and splash guard and having a flexible drive motor located in the base.

FIG. 4 is a side plan view of the embodiment of FIGS. 2 and 3 showing the stirrer appliance of the present invention, transversely extended and with an interchangeable stirrer element and splash guard in place in a saucepan on a heating surface.

FIG. 5 is a side plan view of another embodiment of the stirrer appliance having a motor located in the end of the transverse component of the support and an interchangeable stirrer element with a single piece vertical shaft and a different shaped bottom end which can be interchangeably used with the embodiments of the invention.

FIG. 6c is a partial perspective exploded view of the receiving element of the gear and the leading end of the stirrer element shown in FIG. 6a.

Figure 6A:
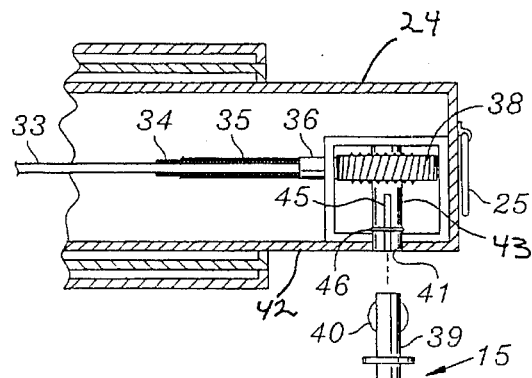
FIG. 6a and b are enlarged fragmentary sectional views taken along lines 6a—6a and 6b—6b of FIG. 2 and in the direction of the arrows showing details of the flexible drive motor and leading end of the stirrer element.

The following is a discussion and description of preferred specific embodiments of the stirrer appliance of this invention, such being made with reference to the drawings. It is to be understood that such discussion and description is not to unduly limit the scope of the invention.

DETAILED DESCRIPTION OF THE PREFERRED EMBODIMENT

Referring now to the drawings and particularly to FIG. 1, the stirrer appliance of the present invention, indicated generally at 12, comprises a base 13, and a hollow support indicated generally at 14 extending upwardly and transversely from the perimeter of the base 13. The support 14 extends beyond the perimeter of the base 13 during use of the stirrer appliance 12 for stirring food in a utensil over a heat source. The support 14 carries a removable and interchangeable insertable stirrer element indicated generally at 15 which consists of an elongated vertical shaft 16 and a bottom end 17 shaped to stir the food contents of an utensil. In a preferred embodiment the elongated vertical shaft 16 has an upper region 18 and a lower region 19. The upper region 18 of stirrer element 15 may be hollow to allow the lower region 19 to slide telescopically therein. This sliding allows the stirrer element 15 to be adjusted to the desired depth within the utensil during use.

Another embodiment of the present invention having an adjustable support extending and contracting in the upward and transverse dimensions is shown in FIGS. 2–5. Thus, as shown in FIG. 2, the support 14 has an adjustable upright member 20 and an adjustable transverse member 21. It is understood that the support 14 may be manufactured so as to be adjustable in various combinations, for example the upright member 20 may be fixed and the transverse member 21 may be extendible and contractible, or the transverse member 21 may be fixed at a length extending beyond the perimeter of the base 13 and the upright member 20 may be extendible and contractible. In embodiments where the upright member 20 is extendible and contractible, the vertical shaft 16 of the stirrer element 15 may be a single piece, for example as shown in FIG. 5 (15a), such that placement of the stirrer element 15 within the utensil is adjusted by adjusting the height of the upright member 20.

As shown in FIG. 3 the support 14 can be extended upwardly by simply grasping and sliding the top member 22 of upright member 20 away from the bottom member 23 of upright member 20. Similarly, the support 14 can be extended transversely by sliding an end member 24 of the transverse member 21 away from the top member 22 of the upright member 20. Preferably a tab or ring 25 is affixed to the end member 24 to facilitate extension of the transverse member 21. Extension of the support 14 permits the stirrer element 15 to be positioned in a utensil 26 located at a distance beyond the base 13, and to be positioned at various heights within the utensil 26, as desired, by manipulating the upright member 20, and/or the vertical shaft 16 of stirrer element 15. Although utensil 26 is depicted in the Figures herein as a saucepan on a stove, the utensil 26 is understood to include a variety of container cooking utensils such as pots, pans, bowls, canisters, baking utensils and the like of various sizes, shapes and materials. The terms "pot", "pan" and "bowl" are used interchangeably herein.

In the embodiments shown in FIGS. 1 through 4, motor 27 is located within the base 13. In use, this embodiment of the stirrer appliance is supported by the base 13 resting on a generally flat surface such as a counter as shown more clearly in FIGS. 3 and 4. The counter will typically be adjacent to a heating source. If desired the base 13 may rest on the surface of the heating source, for example a stove. As shown in the Figures, the base 13 may have a heat resistant bottom surface 28 for protection of the stirrer appliance 12 if placed near or on a heating source such as a stove or oven.

As shown in FIGS. 3 and 4, the stirrer element 15 may have a splash guard 29 for reducing upward splashing of food during use of the stirrer appliance 12.

Figure 11:
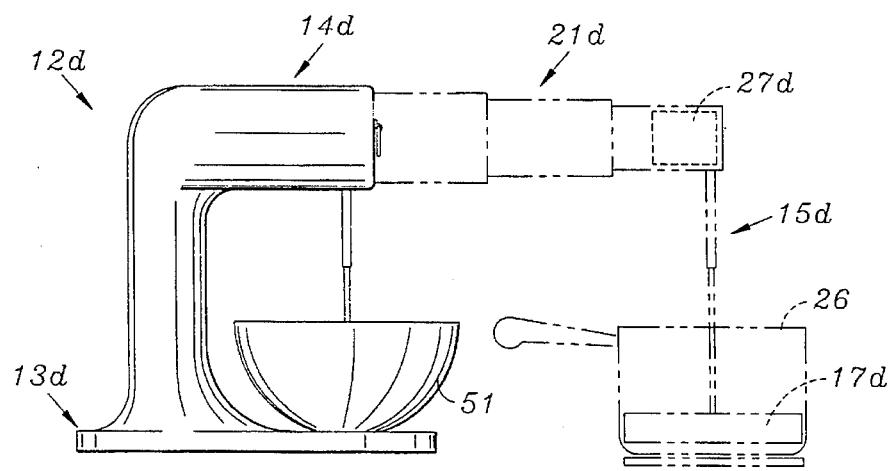
FIG. 11 is a side plan view of another embodiment of the stirrer appliance showing the adjustable transverse support which can be extended to insert an interchangeable stirrer element into a utensil over a heating surface, or can be contracted to insert the stirrer element into a utensil in contact with its base.
Figures 7, 9:
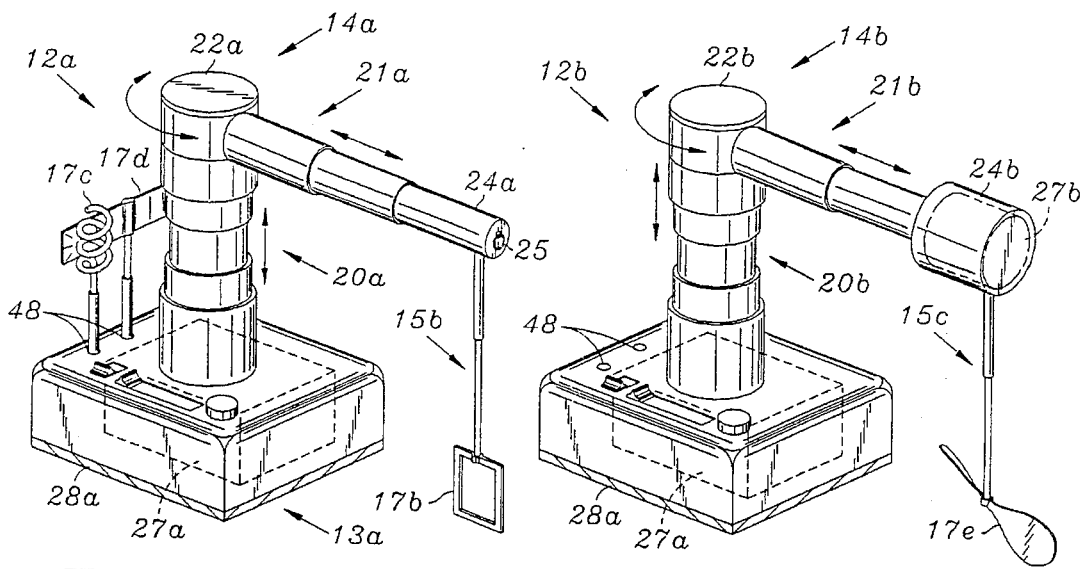
FIG. 7 is a top perspective view of another embodiment of the stirrer appliance of the invention having a base with openings to receive different stirrer elements which can be interchangeably used with the embodiments of the invention and an adjustable support that receives a stirrer element and consists of an adjustable transverse member that rotates around the top of the adjustable upward member of the support.
FIG. 9 is a top perspective view of another embodiment of the stirrer appliance of the invention, similar to the embodiment shown in FIGS. 7 and 8, in which the motor is located at the end of the transverse member of the support and showing a stirrer element having a different shaped end which can be interchangeably used with the embodiments of the invention.

FIG. 5 shows an embodiment in which the motor 27 is located in the end 24 of the transverse member 21 of the support 14. A stirrer element 15a having a single piece shaft 16a and a different shaped bottom end 17a is also depicted. FIGS. 9 and 11 also are embodiments in which the motor (27b and 27d) is also located in the end of the support (14b and 14d).

Motor 27 may be electric, for example a universal motor, or it may be spring wound or a flexible drive type. If electric, the motor 27 may be battery operated or have a conventional connection to an electrical outlet or the like. The motor 27 preferably is a multi-speed motor including gears and/or electronics for providing variable speeds of rotation of the stirrer element 15. Variable speeds provide the ability to select the necessary speed required for stirring foods of different viscosity. User settable controls shown in FIGS. 1 and 2 may be located on the base 13 of the appliance. Controls include an "OFF" and "ON" switch 30 and a speed control 31, and preferably offer the ability to gradually increase or decrease the speed of the motor so as to prevent stress on the motor and splashing of the food contents from abrupt changes in speed. For example, as shown in FIGS. 1 and 2, the speed control 31 may consist of a sliding mechanism operatively connected to the motor that gradually increases or decreases the speed of the motor. In addition, a timer 32 may be associated with the motor 27 to permit the user to operate the stirrer appliance for preselected periods of time.

Figure 6B:
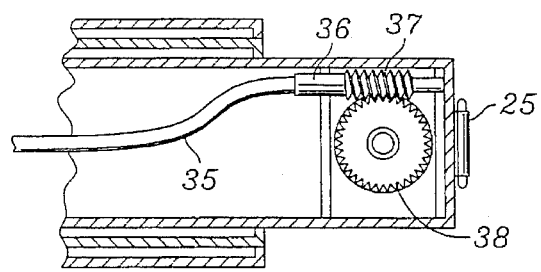

As shown in FIG. 3 and FIG. 4, where the motor 27 in the base 13 is of a flexible drive type, a flexible wire or cable 33 runs from the motor 27 upward and transversely through the support 14 to rotate the stirrer element 15. FIG. 6a and 6b show detail of the flexible drive motor 27. In FIG. 6a the flexible cable 33 is encased by wire coilwrap 34 which in turn ends in outer sheath 35 which is attached to a driveshaft 36. The driveshaft 36 is operatively connected to worm gear 37 which is in operative connection with gear 38. As shown also in FIG. 6a, the leading end 39 of stirrer element 15 having opposing ears 40 is inserted into recess 41 within the bottom surface 42 of the end member 24 of the transverse member 21 of the support 14. The leading end 39 of the stirrer element 15 fits within the hollow receiving element 43, which may be a gear shaft, mounted axially with the gear 38. As the flexible cable 33 rotates about its axis the worm gear 37 rotates about its axis thereby causing gear 38 to rotate about its axis and turn the receiving element 43 about its axis, and the inserted stirrer element 15 likewise to rotate about its axis.

Figure 6C:
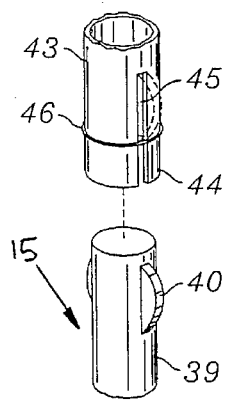

As shown in FIG. 6c, the bottom end 44 of the receiving element 43 has radially spaced slots 45 which mate with the ears 40 at the leading end 39 of the stirrer element 15 and a flexible band 46. As the leading end 39 of the stirrer element 15 is inserted within the receiving element 43 the ears 40 positively engage in the slots 45 and are retained by the flexible band 46, thereby ensuring that the stirrer element 15 rotates about its axis as the gears 37 and 38 rotate about their axes. The coilwrap 34 and outer sheath 35 push the flexible cable 33 into a loop 47, as shown in FIGS. 3 and 4, to accommodate contraction of the transverse member 21 of the support 14.

In an alternative embodiment, as shown in FIG. 7, the stirrer appliance 12a has a support 14a that consists of a vertical adjustable upright member 20a that is telescoping, and an adjustable transverse member 21a that rotates around the top member 22a of the upright member 20a to permit radial changes in the position of the transverse member 21a. In FIG. 7 the transverse member 21a is also shown as extendible and contractible. Also shown in FIG. 7 openings 48 in the base 13a provide for storing various interchangeable stirrer elements 15b having different shaped bottom ends 17b, 17c and 17d.

Figure 8:
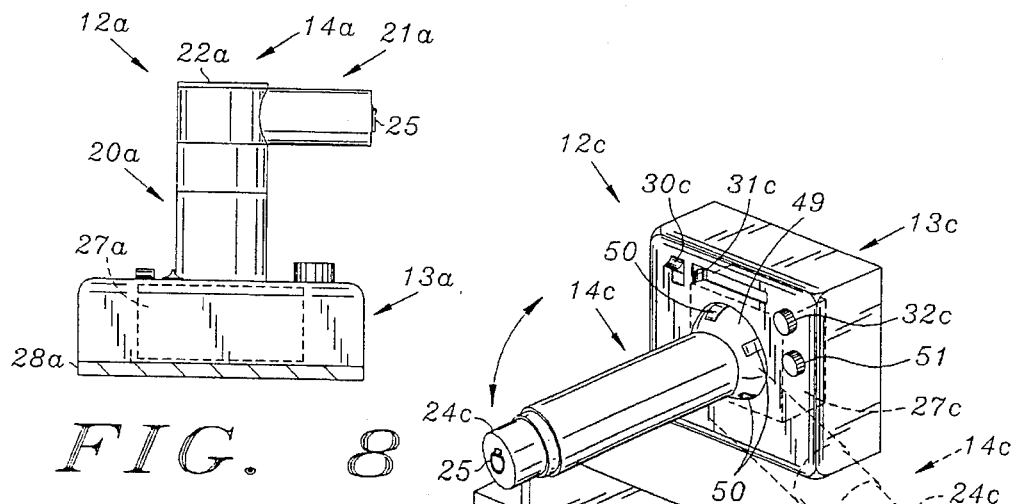
FIG. 8 is a side plan view of the embodiment of FIG. 7 showing the adjustable upwardly extending and transverse members of the support contracted for storage.

FIG. 8 shows the stirrer appliance 12a of FIG. 7 with the upright member 20a and the transverse member 21a of the support 14a contracted for easy storage.

FIG. 9 shows an embodiment of the invention, in which the end member 24b of the transverse member 21b of the support 14b contains the motor 27b. Also shown in FIG. 9 is a stirrer element 15c having a different shaped bottom end 17e.

Figure 10:
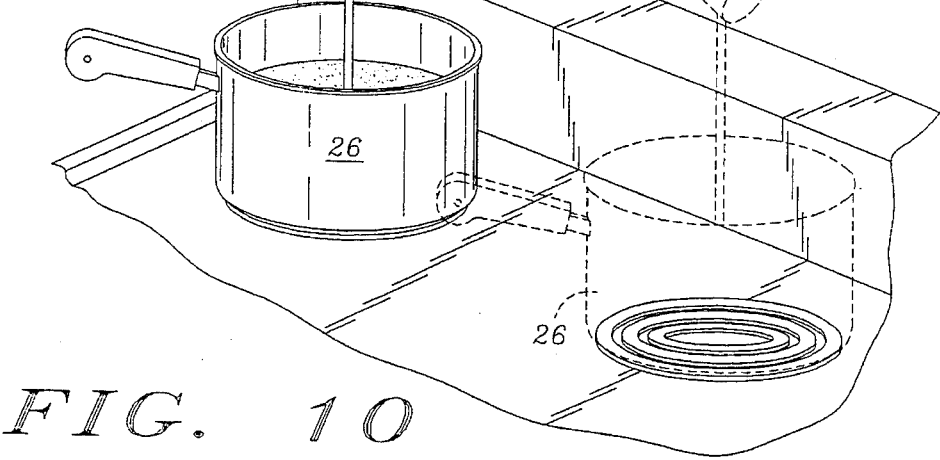
FIG. 10 is a perspective view of another embodiment of the stirrer appliance in which the base is attached to a vertical surface and the adjustable transversely extending support is attached to a ball mechanism to move the support up and down and from side to side, and showing the stirrer appliance in place in a utensil on a heating surface.

In an alternative embodiment as depicted in FIG. 10, the stirrer appliance 12c consists of a base 13c mounted on a vertical surface, for example a wall or cabinet, near a heat source. The transversely extending support 14c is mounted rotatably at its bottom on a generally ball shaped mechanism 49 set into a recess in the base 13c. The support 14c is extendible and contractible in the horizontal direction and can be rotated sideways and up and down by movement around the ball mechanism 49. A locking mechanism to fix the support 14c in various positions is contained within the base 13c and consists of fingers 50 that clasp the ball mechanism 49. A flexible band, for example made of metal, is located within the base 13c and encircles the base of the fingers 50. The band may be tightened by means of control 51, thereby forcing the fingers 50 to clamp the ball mechanism 49 tighter, locking it into place in the desired position. The motor 27c is preferably located in the base 13c in this embodiment. The support 14c thus can be rotated for raising and lowering the stirrer element 15c into the utensil 26 and can also be rotated for stirring foods in another utensil 26 on the heat source as shown in FIG. 10.

In another embodiment illustrated in FIG. 11, a stirrer appliance shown generally at 12d has a base 13d and an extendible and contractible transverse member 21d of the support 14d bearing stirrer element 15d for stirring food in a utensil 26. The stirrer element 15d may be placed in a utensil 26 located beyond the perimeter of the base 13d. Alternatively, a bowl 51 may be placed on the base 13d. The motor 27d is preferably located in the transverse support 14d in this embodiment.

Referring now to FIGS. 2–4, in normal use the freestanding stirrer appliance 12 is placed in the vicinity of utensil 26 containing food to be stirred. The appliance 12 is supported on the base 13 which is placed on a counter or stove. Stirrer element 15 is positioned in the utensil 26 by extending the transverse member 21 of the support 14 beyond the perimeter of the base 13 and by raising or lowering the upright member 20 of the support 14 to the desired height within the utensil 26, and/or by adjusting the shaft 16 of the stirrer element 15. When the motor 27 is activated by means of the user manipulating the controls 30 and 31, the stirrer element 15 rotates at the selected speed within the food to be stirred in the utensil 26. The speed may be increased as needed for stirring food of different viscosity. As described, the stirrer element 15 can be readily inserted into the support 14 for use and can also be easily raised out of the utensil 26 and placed within other utensils containing food, or can be exchanged for a stirrer element 15 having a different shaped bottom 17 which may have various shapes such as a spatula, spoon, paddle, propeller, blade or an "s" shape as shown in FIGS. 1–9. The stirrer element 15 can be easily removed from the support 14 for washing and/or storage of the appliance 12. Because the stirrer element 15 is inserted into the end member 24 of the transverse member 21 in the adjustable embodiments, it is preferable to partially extend the end member 24 of the transverse member 21 before inserting the stirrer element 15 and then the transverse member 21 can be extended further to the desired position. Similarly, before fully contracting the transverse member 21 for storage, the stirrer element 15 is preferably removed. Alternatively, channels can be provided along the bottom of the transverse member 21 to permit the shaft 16 of the inserted stirrer element 15 to slide transversely within the channels with the extension or contraction of the transverse member 21.

It is to be understood that while FIGS. 1–9 herein illustrate a stirrer appliance having a support having an essentially vertical upright member affixed to the base and an essentially transverse member joined to the upright member, or a transverse member rising directly from a vertical base (FIG. 10), other embodiments in which the support exhibits a different geometry are contemplated. For example, the support could consist of an upright component rising at an angle of greater than or less than 90 degrees from the base. Additionally, the adjustable transverse member of the support while shown in the FIGS. herein as essentially telescoping, can be fashioned in various alternative ways so long as the results permit extension and contraction of the transverse member during use and storage. Moreover, the appliance can be adapted to operate more than one, for example two, stirrer elements, where the bottom ends of the stirrer elements consist of shapes with short radii, for example paddles, as shown in FIG. 7.

While there has been shown and described herein specific embodiments of the present invention, it will be apparent to those skilled in the art that various changes and modifications may be made without departing from the spirit and scope of the invention. The specific embodiments described herein are given by way of example only and the invention is limited only by the terms of the appended claims.

What is claimed is:

1. An appliance for use in stirring food in a utensil during food preparation, said appliance comprising:
    a) a free-standing base defining a perimeter;
    b) a support affixed to said base, said support comprising an upwardly extending portion and a portion extending in a transverse direction relative to said upwardly extending portion, said support being selectively extendible and contractible in both the upward and transverse directions;
    c) means in said support for removably receiving a downwardly directed stirrer element for stirring food in the utensil; and
    d) a motor operatively connected with said receiving means.

2. The appliance of claim 1 wherein said support comprises an upright member extending upwardly and a transverse member extending transversely connected to said upright member, and said transverse member has said receiving means.

3. The appliance of claim 1 wherein said support is telescoping.

4. The appliance of claim 1 wherein said motor is contained in the base.

5. The appliance of claim 1 wherein said motor is located in the support.

6. The stirrer appliance of claim 1 further comprising at least one removable interchangeable elongated stirrer element comprising a shaped bottom end for insertion into a utensil to stir food and a leading end for inserting into said receiving means.

7. The stirrer appliance of claim 6 wherein said shaped bottom end of said elongated stirrer element comprises a shape for stirring the food in the utensil, said shape selected from the group consisting of a spatula, spoon, paddle, propeller, blade and an "s" shape.

8. The stirrer appliance of claim 6 further comprising a splash guard encircling said elongated stirrer element for limiting upward splashing of the food contents out of said utensil during operation of said stirrer appliance.

9. The stirrer appliance of claim 1 wherein said motor includes means for operating said motor at variable speeds for rotating a stirrer element at variable speeds to accommodate stirring food of different viscosities.

10. The stirrer appliance of claim 1 further comprising a timer for setting the time for operation of said motor.

11. The stirrer appliance of claim 1 wherein said base is heat resistant.

12. The stirrer appliance of claim 1 including a flexible drive means operatively connected to said motor.

13. An appliance for use in stirring food in a utensil during food preparation, said appliance comprising:
    a) a free-standing base defining a perimeter;
    b) an upwardly extending member affixed at one end to said base and having a free end, and said upwardly extending member being selectively extendible and contractible in the upward direction;
    c) a transversely extending member affixed at the free end of said upwardly extending member and also being selectively extendible and contractible in a direction transverse to said upwardly extending member,
    d) means in said transverse member for receiving a downwardly directed stirrer element for stirring food in the utensil; and
    e) a motor operatively connected with said receiving means.

14. The stirrer appliance of claim 13 wherein said transverse member is in rotational contact with the top of said upright member.

15. The stirrer appliance of claim 13 wherein said motor is contained within the base.

16. The stirrer appliance of claim 13 wherein said base further comprises means for receiving elongated stirrer elements for storage.

17. The appliance of claim 13, wherein said upwardly extending member and said transversely extending member are telescoping.

* * * * *